US010857959B2

(12) United States Patent
Sicking et al.

(10) Patent No.: US 10,857,959 B2
(45) Date of Patent: Dec. 8, 2020

(54) CONTROLLED AXLE RELEASE MECHANISM FOR A TRUCK TRAILER ATTENUATOR

(71) Applicant: Safety By Design, Inc., Lincoln, NE (US)

(72) Inventors: Dean L. Sicking, Indian Springs Village, AL (US); John R. Rohde, Whitefish, MT (US); King K. Mak, San Antonio, TX (US); John D. Reid, Lincoln, NE (US)

(73) Assignee: Safety By Design, Co, Lincoln, NE (US)

( * ) Notice: Subject to any disclaimer, the term of this patent is extended or adjusted under 35 U.S.C. 154(b) by 231 days.

(21) Appl. No.: 16/169,242

(22) Filed: Oct. 24, 2018

(65) Prior Publication Data
US 2020/0130617 A1     Apr. 30, 2020

(51) Int. Cl.
*B60R 19/00* (2006.01)
*E01F 15/14* (2006.01)
*B62D 21/20* (2006.01)

(52) U.S. Cl.
CPC .............. *B60R 19/00* (2013.01); *B62D 21/20* (2013.01); *E01F 15/148* (2013.01); *B60R 2019/005* (2013.01)

(58) Field of Classification Search
CPC ... B60R 19/00; B60R 2019/005; B62D 21/20; B62D 21/152; B62D 21/155; B62D 65/06; B62D 65/061; E01F 15/148; B62K 27/14; B60D 1/243

USPC ............ 296/187.03; 280/784, 789, 656, 292, 280/406.2
See application file for complete search history.

(56) References Cited

U.S. PATENT DOCUMENTS

| | | | | |
|---|---|---|---|---|
| 4,807,894 A * | 2/1989 | Walker | ................. | B62D 63/061 280/63 |
| 4,823,923 A * | 4/1989 | Moyer | .................... | B60R 19/34 188/375 |
| 5,172,948 A * | 12/1992 | Garnweidner | .......... | B60R 19/34 293/133 |
| 5,875,875 A * | 3/1999 | Knotts | .................... | B60R 19/34 188/268 |
| 5,947,452 A * | 9/1999 | Albritton | ................. | B60R 19/00 256/13.1 |
| 6,308,809 B1 * | 10/2001 | Reid | ....................... | F16F 7/125 188/377 |
| 6,668,989 B2 * | 12/2003 | Reid | ..................... | E01F 15/148 188/377 |
| 7,690,687 B2 * | 4/2010 | Reid | ..................... | E01F 15/148 280/784 |

(Continued)

FOREIGN PATENT DOCUMENTS

DE       102012014375 A1 *  1/2014  ............ B62D 21/09

*Primary Examiner* — Hilary L Gutman

(57) ABSTRACT

A crash attenuation system having an improved, controlled axle release mechanism for a truck trailer mounted attenuator. The axle release mechanism has an axle release insert disposed within an outer bursting tube which is urged downstream by a mandrel resulting in controlled shearing of the fasteners passing through different size elongated slots in the insert and retaining the insert within the bursting tube. Differential shear forces cause the fasteners to shear at different times as the insert is urged downstream resulting in a controlled release of the breakaway axle assembly.

8 Claims, 7 Drawing Sheets

(56) References Cited

U.S. PATENT DOCUMENTS

| | | | | |
|---|---|---|---|---|
| 10,081,245 B2* | 9/2018 | Sangha | ............... | B60K 17/04 |
| 2006/0151986 A1* | 7/2006 | Reid | ............... | B60R 19/00 |
| | | | | 280/784 |
| 2006/0226665 A1* | 10/2006 | Kwok | ............... | B60R 19/34 |
| | | | | 293/155 |
| 2020/0130617 A1* | 4/2020 | Sicking | ............... | B62D 21/15 |

* cited by examiner

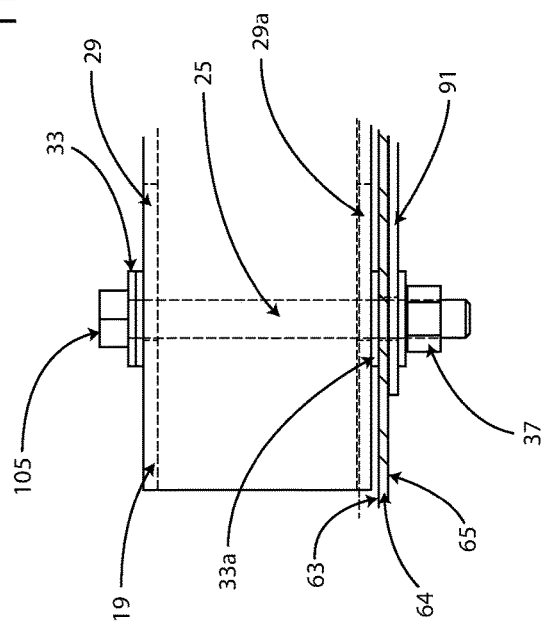
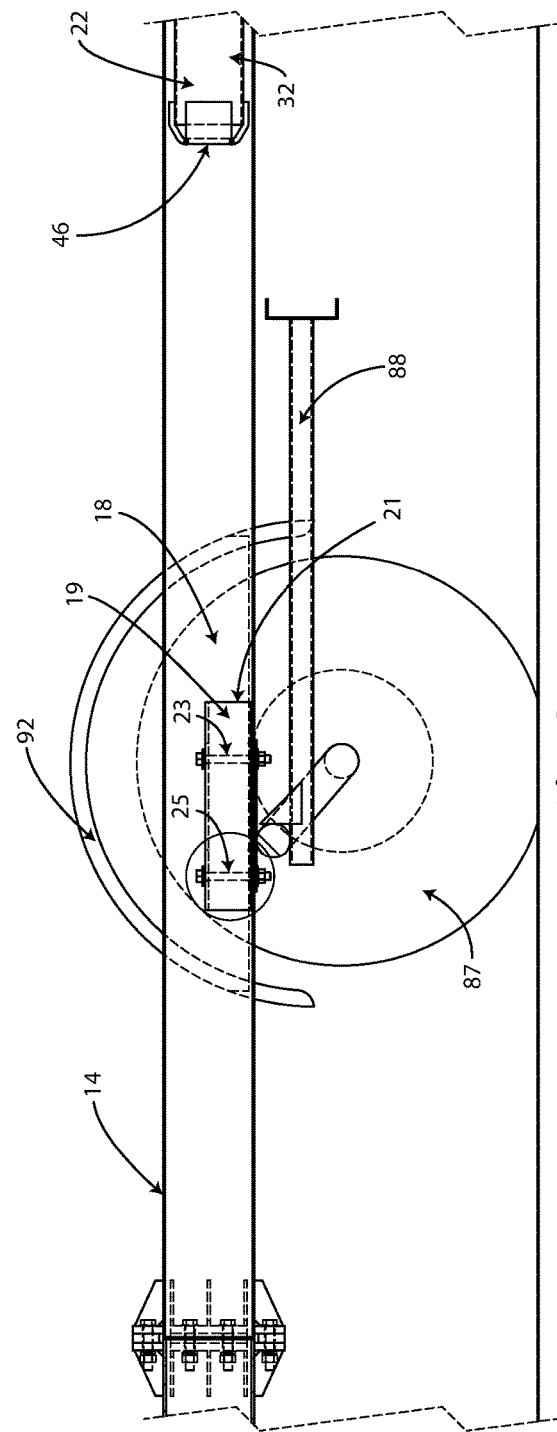
Fig 2A
Fig 2

CONTROLLED AXLE RELEASE MECHANISM FOR A TRUCK TRAILER ATTENUATOR

BACKGROUND OF THE INVENTION

This application relates to an improved axle release mechanism for a truck trailer mounted attenuator system.

In U.S. Pat. No. 7,690,687 a truck trailer mounted attenuator (TTMA) is disclosed. The disclosure of U.S. Pat. No. 7,690,687 is hereby fully incorporated into this present disclosure for all purposes. The present invention is a significant improvement in the axle release mechanism disclosed in U.S. Pat. No. 7,690,687.

Trailer truck mounted attenuators are most efficient and easily operated when the trailer frame is part of the attenuation system and the axle is mounted near the center of the trailer. In such a configuration, the axle must be separated from the trailer during an impact. The connection must provide the certain characteristics in order to assure proper function.

The forces required to activate the axle release system are generated by deceleration forces applied to an impacting vehicle. If the activation forces are excessive, high decelerations transmitted to impacting vehicles can produce serious injury or fatalities. Limiting vehicle decelerations is key to controlling driver risks during high speed impacts with any attenuation system.

Many energy absorbing systems rely on the deformation of the frame members as the primary energy dissipation system. Any time a deformation process relies on pushing elements through a constricted space, such as when one tube slides inside of another tube, local deformations of either tube can produce interference that inhibits the energy absorbing process and thereby raise the forces applied to an impacting vehicle. The present breakaway axle release mechanism prevents local deformation of the energy dissipation elements.

Axle connections are subjected to high forces when an attenuating trailer is towed along rough roads. These high forces are frequently a source of fatigue crack initiation and growth. The connections at the axle and the frame must be capable of withstanding at least a million cycles of vibration in order to be assured of a reasonable life span. The present improved axle release mechanism is capable of withstanding such cycles of vibration.

Simple assembly and disassembly of the present mechanism allows for rapid repair/replacement of damaged components. This feature does not affect the safety performance of an attenuator, but it assures that needed maintenance and repair will be completed in a timely fashion, thereby making the safety device available for being put back in service to improve reliability and maximize safety performance.

SUMMARY OF THE PRESENT INVENTION

The Truck Trailer Mounted Attenuator (TTMA) of the present invention employs a tubular axle insert that is much smaller than either the inner (mandrel tube) or the outer (frame rail assembly) tube. The axle insert tube uses elongated bolt slots in the top and bottom sides of the insert to allow the insert to begin to slide along the bottom, inner side of the outer (frame rail assembly) tube before any of the axle release fasteners or attachment bolts are loaded in shear. This feature assures that the axle insert tube is traveling near the speed of the inner (mandrel) tube when bolts are struck. The high velocity limits the time frame over which the bolt fracture can occur. Limiting the time frame also reduces the energy and peak forces that are absorbed and generated respectively.

Full scale testing of the axle release mechanism indicated that without high strength washers to prevent the axle release fastener bolts from gouging into the inner and outer tubes, the axle release mechanism had a propensity to deform locally and induce interference between the outer and inner tubes. The present invention incorporates high strength washers with the system producing clean cleaving of the fastener bolts without any local deformation of the tubes.

As noted above, present invention has a pair of elongated bolt slots in both the top and bottom sides of the axle insert. The first, upstream slots are of a shorter length than the second, downstream set of bolt slots. This feature of the present invention allows the axle fastener bolts to break independently, thereby reducing the peak forces by approximately 50%. This large reduction in bolt breaking force allows the trailer to incorporate much larger bolts in connecting of the axle to the frame. These larger bolts provide much greater resistance to vibration and fatigue.

Further yet, oversized access holes in the top side of the outer (frame rail assembly) tube aligned above the bolt heads of the fasteners provide for rapid removal of the axle without the need to disassemble any other components. This greatly simplifies assembly and repair of the trailer.

BRIEF DESCRIPTION OF THE DRAWINGS

FIG. 2 further illustrates a side elevation view of the present invention with a portion within a detail circle.

FIG. 2A is a detailed view of the circled portion of FIG. 2.

FIG. 4A is a side elevation view of the breakaway axle mechanism before the insert is urged downstream.

FIG. 4B shows the insert initially moved downstream placing the leading fastener in shear.

FIG. 4C shows the leading fastener broken and the second fastener experiencing shear forces as the insert is urged downstream.

FIG. 4D illustrates the insert urged further downstream, breaking the second fastener and releasing the breakaway axle mechanism from the attenuator frame.

FIG. 6A shows the insert in a top plan view.

FIG. 6B illustrates a side elevation view of the insert of the present invention.

FIG. 6C is an end view of the insert.

DETAILED DESCRIPTION OF THE PREFERRED EMBODIMENT

Figure 1:
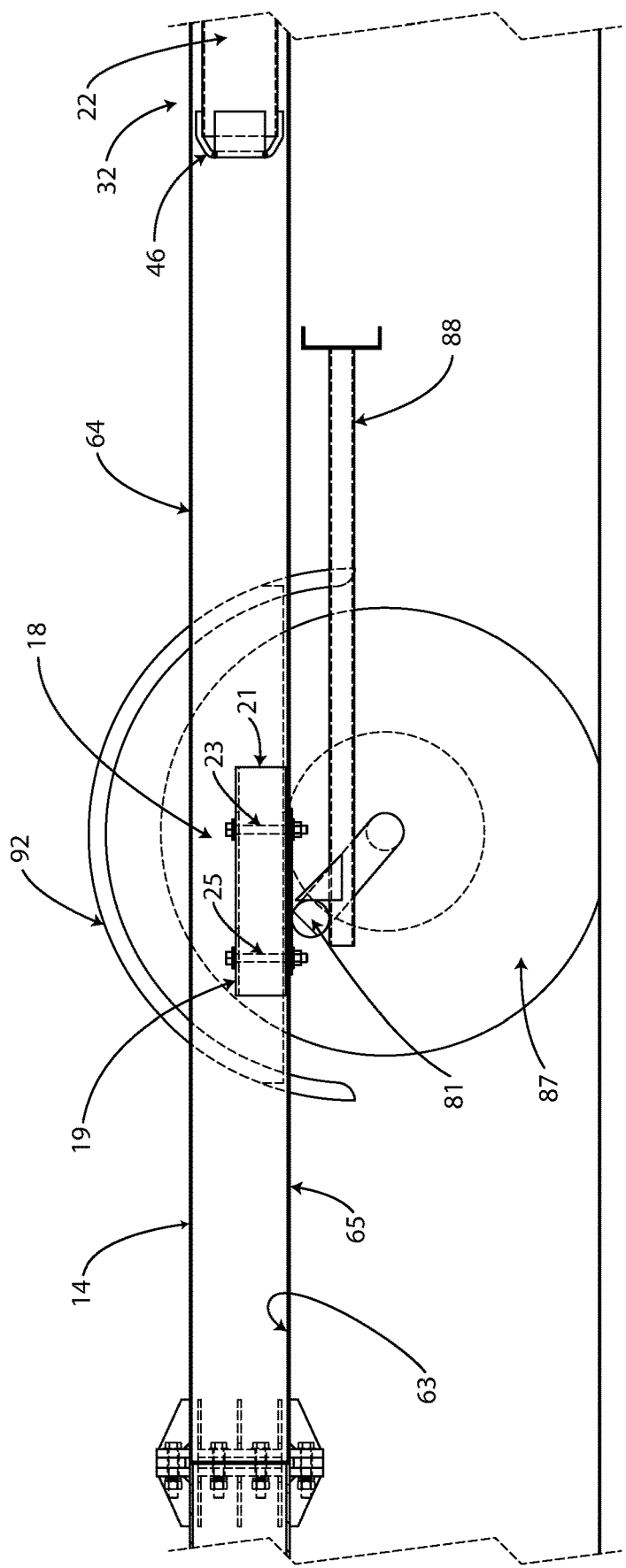
FIG. 1 illustrates a side elevation view of a section of the attenuator of the present invention.
Figure 3A:
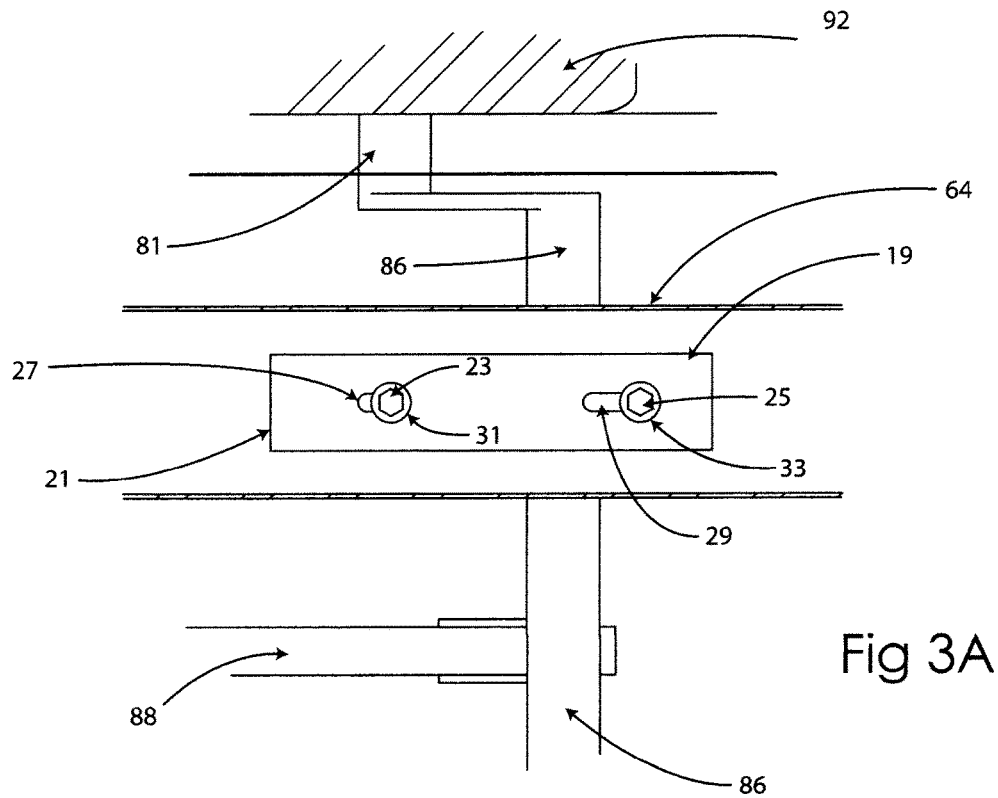
FIG. 3A is a detailed view of the circled portion of FIG. 3.
Figure 3:
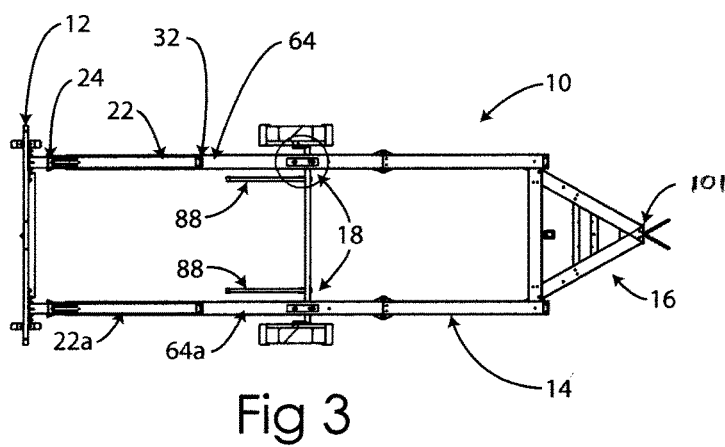
FIG. 3 is a top plan view of the attenuator of the present invention with a portion within a detail circle.
Figure 5:
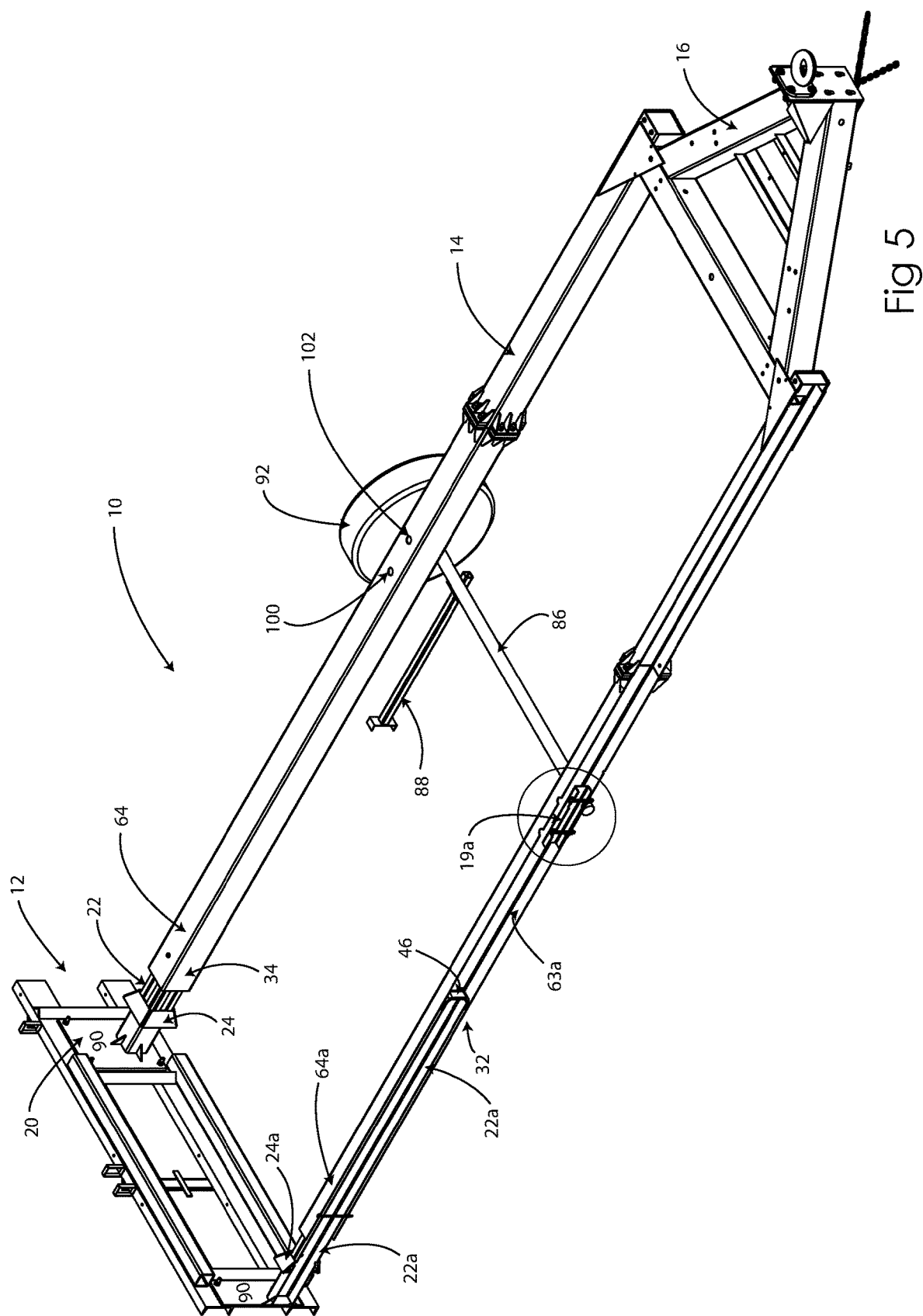
FIG. 5 shows a perspective view of the present attenuator with the outer side of the frame rail assembly removed for clarity purposes. A portion of the axle release mechanism is in a detail circle.

As seen in FIGS. 1, 3, and 5 the present inventive truck trailer mounted attenuator 10 has an impact head assembly 12; a trailer frame 14; a hitch assembly 16; and a breakaway axle assembly 18. FIG. 1 illustrates the journals 81 of the breakaway axle assembly 18 affixed to a conventional wheel set and tire arrangement 87. The hitch 101 (FIG. 3) is connected to a towing vehicle (not shown). All of these structural elements are shown and described in U.S. Pat. No. 7,690,687 which is fully incorporated herein for all purposes.

The impact head assembly 12 is connected to a first end of the trailer frame member 14 which has the hitch assembly 16 at a second opposite end of the frame member. The breakaway axle assembly 18 is mounted to the frame member by axle release fasteners or bolts 23 and 25.

The frame includes a first frame rail 64 generally parallel to and spaced apart from a second frame rail assembly 64a. The first and second frame rail assemblies are connected to one another at an end opposite the impact head assembly 12 by the hitch assembly 16.

As seen in FIGS. 3 and 5, the breakaway axle assembly further connects the first and second frame rail assemblies when the impact head assembly is in unimpacted position. Each of the first and second frame rail assemblies is identical in construction (6×6×⅛ in. ASTM A500 Grade B structural tubing) and functions as an energy-absorbing tube.

FIG. 5 illustrates a perspective view of the frame 14 showing first frame rail assembly 64 with the second frame rail 64a having the outer side of the rail 64a removed for clarity purposes.

FIGS. 3 and 5 further show two mandrel tubes 22 and 22a attached to the back of the impact head assembly 12. Each mandrel tube 22 and 22a is fabricated from a 4 ft. 8 in. long section of 4.5×4.5×⅛ in. ASTM A500 Grade B structural tubing. A tapered mandrel member 24, fabricated from ⅜ in. thick plates, is welded to each tube 22 and 22a. The cross-sectional dimension of the mandrel member 24 increases from 5.25 in.×5.25 in. to a maximum of 7.8 in×7.8 in. The inside dimensions of the cooperating outer, energy absorbing, frame rail assembly tubes 64 and 64a is 5.75 in.×5.75 in.

The downstream end 32 of the mandrel tube 22 is inserted into the upstream end 34 of the energy absorbing, frame rail tube 64 and 64a such that the mandrel tube 22 extends within the energy absorbing rail tube approximately at least 5 feet before the front of the mandrel member 24 engages with the upstream end of the rail tube during impact of a vehicle with the impact head 12 thereby initiating bursting of the frame rail assemblies. It has been found that this 5 feet distance is necessary to insure that the mandrel tube 22 sliding within the bursting tube does not jam or get urged outside the side wall of the tube 64 or 64a.

The downstream end 32 of the mandrel tube 22 and 22a has a tapered end 46, fabricated by welding ⅜ in. thick bent plates to the tube 22 and 22a, which acts like a plunger to shear shear-off bolts at connections and hinges, but more importantly in the present inventive improvement, to engage the upstream edge 21 of the axle insert tube 19 as will be described in further detail below.

Details of the controlled axle release mechanism of the present invention are shown in attached figures. In FIGS. 1 and 2, axle release insert tube 19 may be seen disposed inside frame rail assembly 64. It should be understood that an axle release insert tube is also disposed inside frame rail assembly 64a (see FIG. 5). The insert tube 19 is retained in the frame rail by axle release fasteners or bolts 23 and 25.

FIG. 2A illustrates the details of axle release fastener bolt 25 extending through high strength washer set 33, through an upper, long slot 29 in the top of axle release insert 19, through a lower, long slot 29a in the bottom of axle release insert 19, through the high strength washers 33a between the bottom side of insert 19 and the bottom inside 63 of rail assembly 64, through axle mounting plate 91 and finally retained by fastener nut 37.

FIG. 3 illustrates a top plan view of a TTMA 10 with a breakaway axle mechanism 18 of the present invention. Details are shown in FIG. 3A wherein a top view of the inside of the rail assembly 64 discloses the axle release insert 19 attached to the inner bottom of the rail 64. Also seen are the axle 86, wheel journal 81, and fender 92. A push rod 88 is shown attached to the axle 86. Each push rod 88 is 3 ft. long and fabricated from 1.5 in.×1.5 in.×11 gage thick tubes.

Two push rods or axle accelerators 88 are designed to engage the back side 90 of the front impact plate 20 and are attached to the axle 86 (See FIG. 3). These push rods 88 are designed to engage the back side 90 of the front impact plate 20 as the impact head assembly 12 is pushed forward upon impact, thus allowing the breakaway axle assembly 18 to be pushed forward of the bursting process. The fenders 92 are designed as both restraints and guides to keep the breakaway axle assembly 18 moving along the energy absorbing tubes 64 and 64a.

Figure 4A:
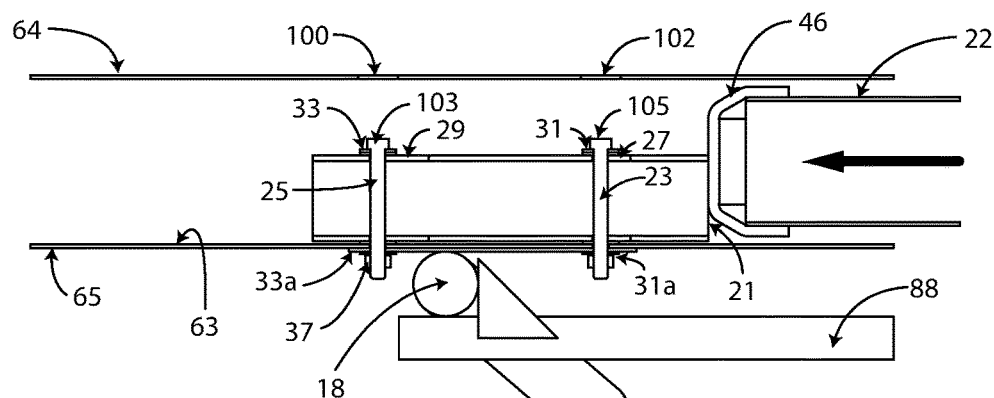
FIGS. 4A-4D illustrate detailed views of the controlled axle release mechanism as the inner mandrel advances downstream upon impact.
Figure 4B:
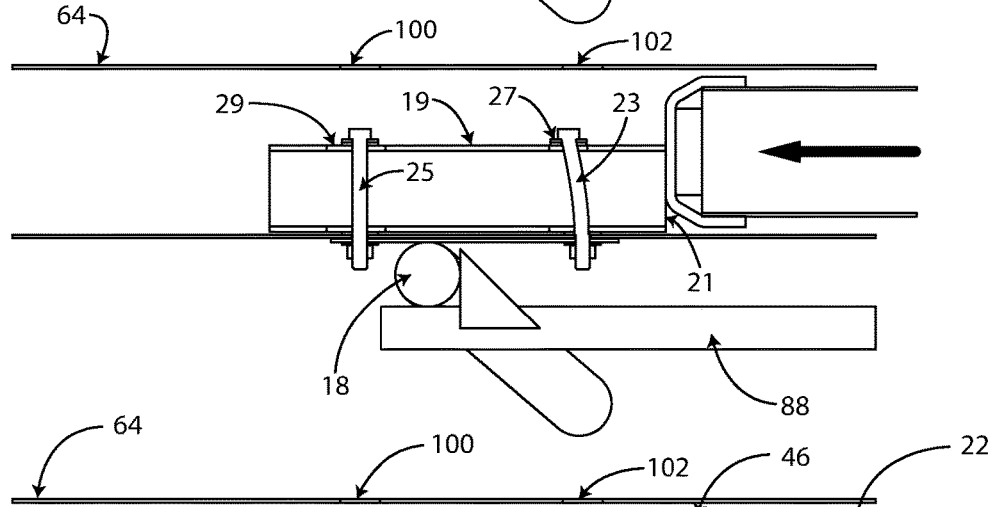
Figure 4C:
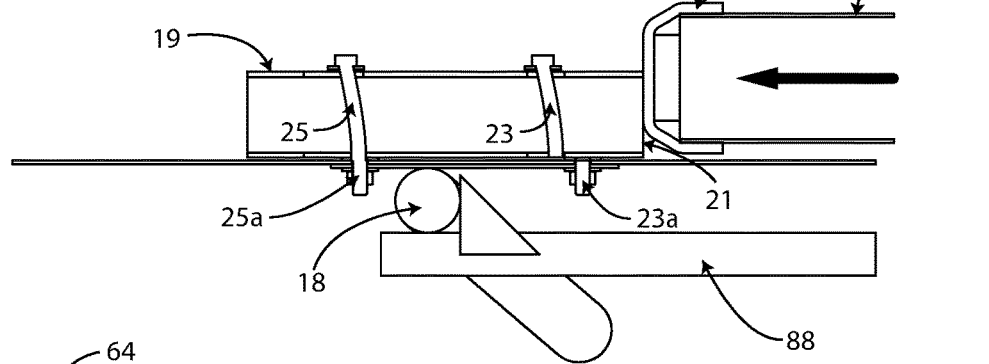
Figure 4D:
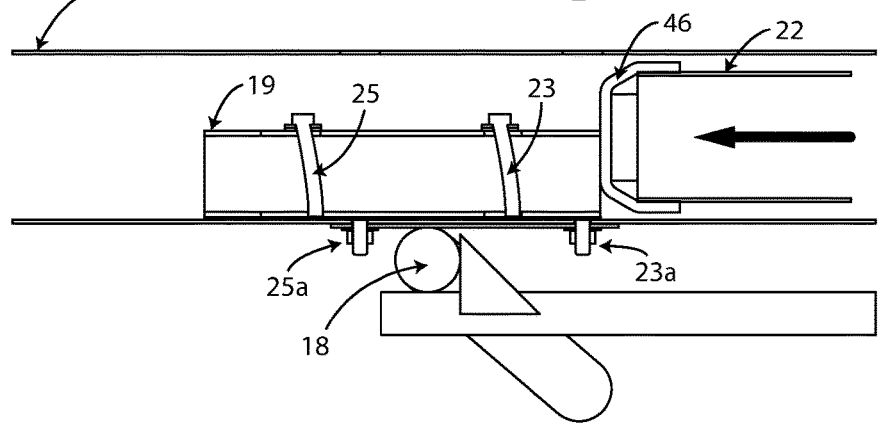

FIGS. 4A-4D illustrate the axle release mechanism 18 as the attenuator moves from a position where the tapered end 32 of the mandrel tube 22 initially engages the upstream edge 21 of the axle release insert 19 (FIG. 4A) to a position where the insert 19 has sheared both fastener bolts 23 and 25, thereby releasing the axle assembly 18 from the frame 14 (See FIG. 4D). In FIGS. 4A-4C the breakaway axle mounting plate 91 is attached to the underside 65 of the outer, frame rail assembly 64. In FIG. 4D the axle mounting plate 91 is totally disconnected from the rail 64. This process, as shown in FIGS. 4A-4D, shows how the improved axle release mechanism operates to provide a controlled axle release. It should be understood that the same process occurs with the other frame rail assembly 64a.

FIG. 4A shows that both fasteners 23 and 25 are securely retaining insert 19 within the outer rail tube 64. FIG. 4B illustrates that the mandrel 22 has urged the insert 19 downstream, placing bolt 23 under shear forces. FIG. 4C shows a further urging of the insert downstream by the mandrel 22, causing bolt 23 to shear leaving bolt section 23a behind, and further shows that bolt 23 begins to experience shear forces. Finally in FIG. 4D, the insert 19 has been further urged downstream by the mandrel 22 such that bolt 25 has also sheared, leaving bolt segment 25a behind. In FIG. 4D the axle 18 has been fully released from the frame 14. This controlled shearing of bolts 23 and 25 results in a controlled release of the breakaway axle from the frame.

As seen in FIGS. 3A, 4A-4D, and 5A, upper 29 and lower 29a elongated slots are formed downstream in the top and bottom sides of insert 19 while shorter (in length) upper 27 and lower 27a elongated slots are formed upstream on the top and bottom sides of the insert. As a result of the different lengths of the slots 29, 29a, 27 and 27a, the end of the slots place shear forces on the bolts at different times, resulting in a controlled release of the breakaway axle mechanism.

As may be understood in FIGS. 4A-4D, the velocity of the insert 19 inside the rail 64 is approximately the same velocity of the mandrel 22 when the release fastener 23 passing through elongated slots 27 and 27a is loaded in shear.

High strength washers 31, 31a, 33 and 33a as illustrated in FIGS. 2A, 3A, 4A-4D, and 5A have been shown to prevent the axle release fastener bolts 23 and 25 from gouging into the inner mandrel tubes 22 and 22a, and the outer frame rail tube 64 and 64a as the axle insert 19 is urged downstream within the outer frame rail tubes 64 and 64a. These washers provide clean cleavage of the bolts without local deformation of the tubes or insert.

As shown in FIGS. 4A-4D, 5 and 5A, the present invention provides for oversized access holes 100 and 102 (1 ⅜ in.) in the top side of each of the frame rail assemblies 64 and 64a positioned so as to align with the bolt heads 103 and 105 of bolts 23 and 25 and allow space for disassembly of the breakaway axle assembly.

Figure 5A:
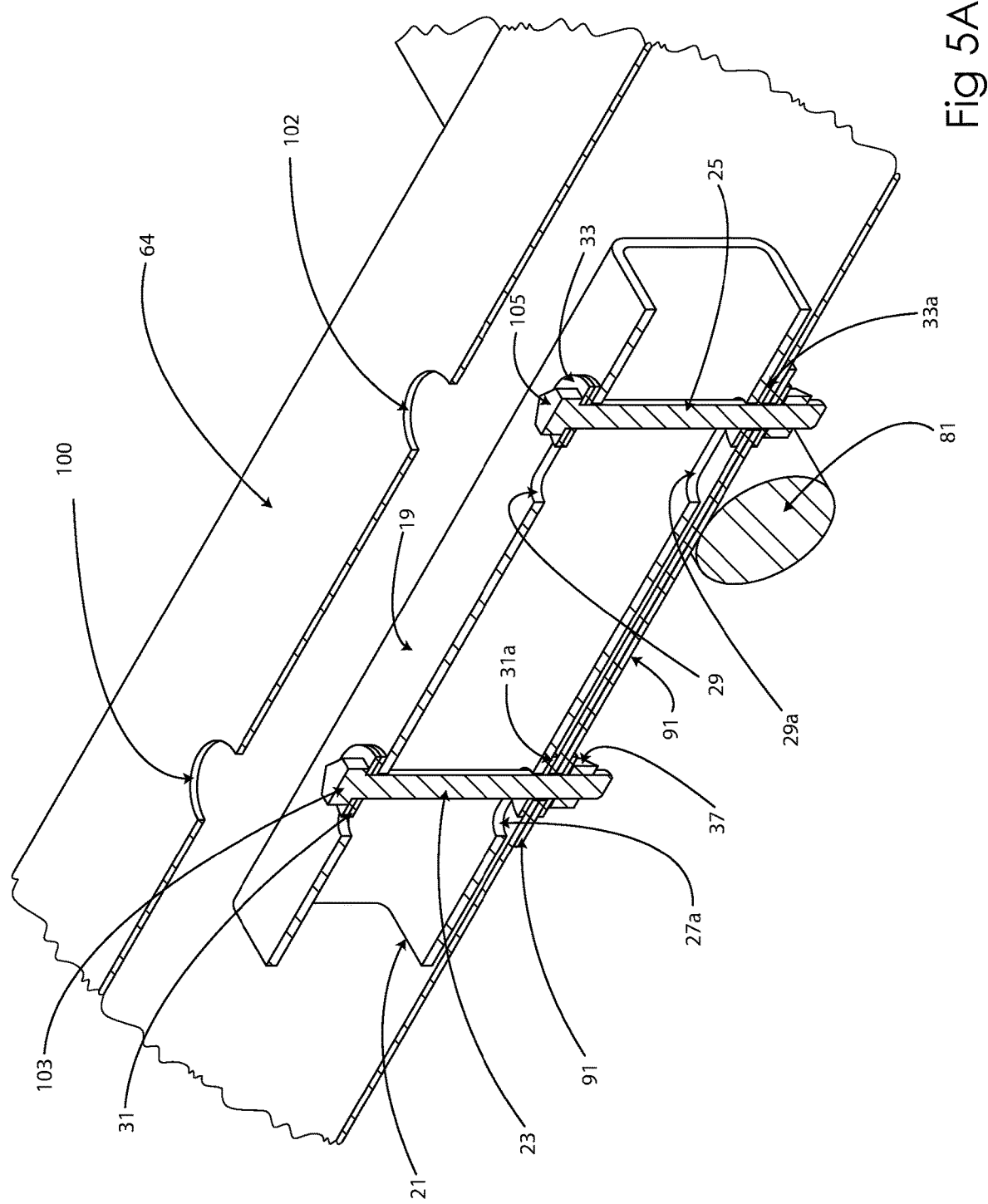
FIG. 5A illustrates a detailed view of the circled portion of FIG. 5.

FIG. 5 illustrates a TTMA 10 with the outer sidewall of the rail assembly 64a removed for clarity purposes. The inner, mandrel tube 22a is shown extending through the upstream opening in the outer rail 64a and extending downstream within the rail 64a. Tapered end 46 is directed downstream toward the axle release insert 19a affixed to the inner, bottom side 63a of the rail 64a. The second push rod (see FIG. 5) is not shown for clarity purposes. Details of how the insert 19 is retained inside of rail 64 are shown in FIG. 5A.

Figure 6C:
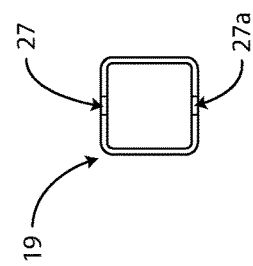
FIGS. 6A-6C illustrate the structural elements of the axle release insert of the present invention.
Figure 6B:
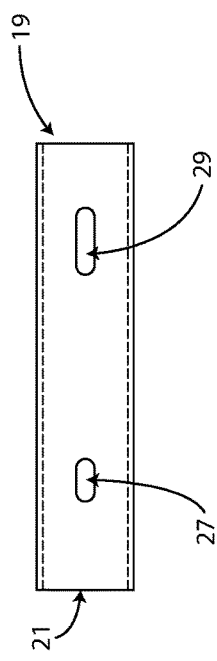
Figure 6A:
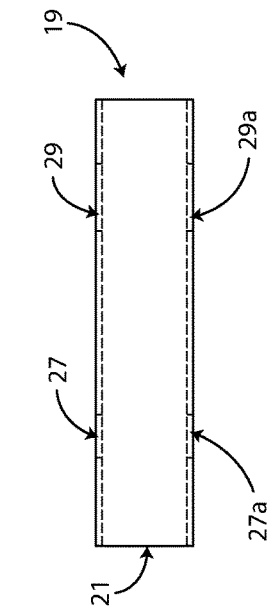

FIGS. 6A-6C illustrate the details and dimensions of an axle release insert 19. FIG. 6A shows a top plan view of the insert 19 having a first, leading edge 21 which when retained inside rail element 64 is directed upstream in the attenuator. A short, elongated slot 27 (9/16 in. diameter on ¾ in. center-to-center) is formed in the insert on the upstream end and a longer, elongated slot 29 (9/16 in. diameter on 1½ in. center-to-center) is formed in the downstream end. FIG. 6B illustrates a side elevation view of the ASTM A500 Grade B structural tubing, 133/4 in. long, insert 19 showing the short slots 27 and 27a formed in the top and bottom, respectively, in the upstream end. Longer elongated slots 29 and 29a are formed in the top and bottom, respectively, in downstream end of the insert. FIG. 6C is an upstream, end view of the 3×3×3/16 in. insert 19. The short, elongated slots 27 and 27a are shown in the top and bottom, respectively, of the insert.

Although the invention has been described with reference to specific embodiments, this description is not meant to be construed in a limited sense. Various modifications of the disclosed embodiments, as well as alternative embodiments of the inventions, will become apparent to persons skilled in the art upon reference to the description of the invention. It is, therefore, contemplated that the appended claims will cover such modifications that fall within the scope of the invention.

What is claimed is:

1. A crash attenuation system comprising:
    an impact head assembly connected to a first end of a trailer frame member having a hitch assembly at a second opposite end of said frame member; and a breakaway axle assembly mounted to said frame member by axle release fasteners, wherein said trailer frame member comprising:
    a first frame rail assembly generally parallel to and spaced apart from a second frame rail assembly, said first and second rail assemblies connected to one another at said second end of said frame member by said hitch assembly, said breakaway axle assembly further connecting said first and second rail assemblies when said impact head assembly is in a first, unimpacted, position, an axle release insert disposed inside each of said first and second frame rail assembly for controlling the release of said breakaway axle assembly when said impact head assembly is in a second, impacted, position, said axle release fasteners extending through first and second sets of bolt slots in said insert and adapted to release said breakaway axle assembly from said frame member when said impact head assembly is in said second, impacted position.

2. The system of claim 1 wherein each of said first and second frame rail assemblies comprises a mandrel slidably extending inside each of said frame rail assembly, said mandrel adapted to engage an upstream end of said axle insert when said impact head assembly is in said impacted position to urge said insert downstream inside each of said frame rail assembly.

3. The system of claim 2 wherein said first set and said second set of bolt slots in said insert are in top and bottom sides of said insert and said first set of bolt slots are upstream of said second set and are shorter in length than said second set of bolt slots.

4. The system of claim 3 wherein said mandrel initially urges said insert to slide downstream in each of said frame rail assembly and said axle release fasteners are not loaded in shear.

5. The system of claim 4 wherein the velocity of said insert inside said frame rail assembly is approximately the same velocity of said mandrel when an axle release fastener passing through said first set of bolt slots is loaded in shear.

6. The system of claim 5 further comprising a plurality of high strength washers disposed between bolt heads of said axle release fasteners extending through said sets of said slots in said insert and said top side of said insert, said washers providing clean cleavage of said bolts without local deformation of said insert and said mandrel.

7. The system of claim 6 further comprising access holes in a top side of each of said frame rail assembly, said access holes disposed above said axle release fastener bolt heads and providing space for disassembly of said breakaway axle assembly.

8. The system of claim 2 wherein said mandrel tube has a tapered mandrel member affixed to said mandrel tube, said mandrel tube extending within said first and second frame rail assembly for a distance of at least 5 feet before a front of said mandrel member engages an upstream end of said first and second frame rail assembly during impact.

* * * * *